April 2, 1963   W. WAGENSEIL   3,083,485
AUDIO-VISUAL DEVICE
Filed June 17, 1960
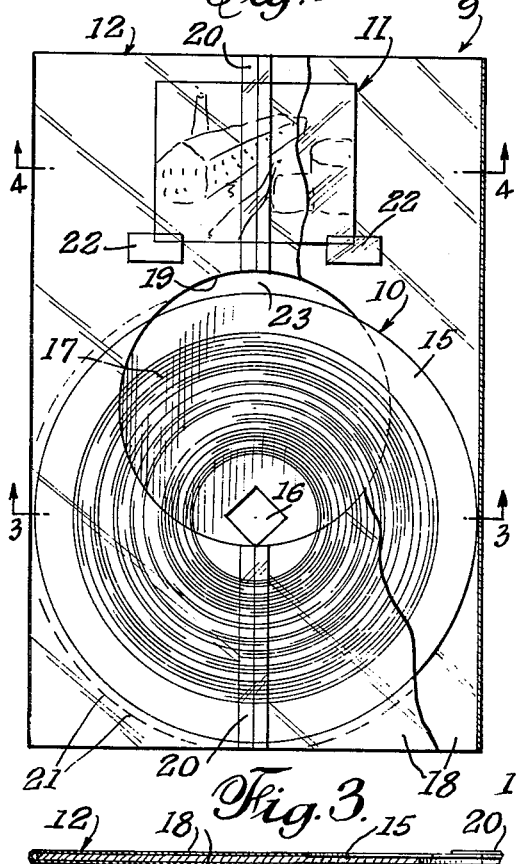
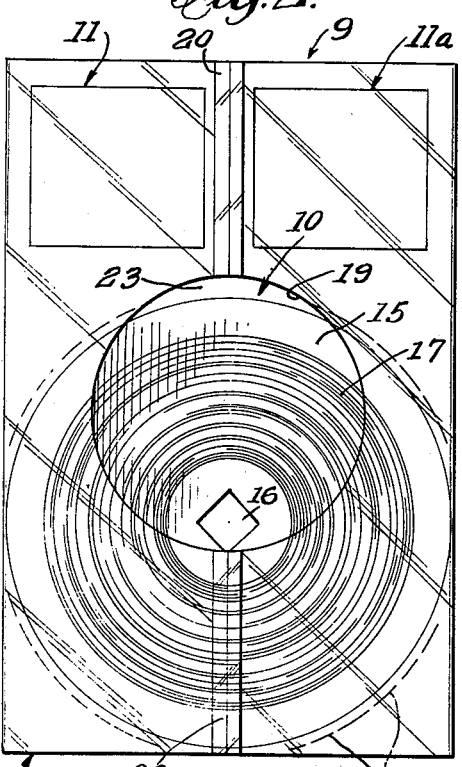
INVENTOR.
WILLIAM WAGENSEIL
BY C. G. Stratton
ATTORNEY

United States Patent Office 3,083,485
Patented Apr. 2, 1963

3,083,485
AUDIO-VISUAL DEVICE
William Wagenseil, 844 Rincon Lane,
Palos Verdes Estates, Calif.
Filed June 17, 1960, Ser. No. 36,968
2 Claims. (Cl. 40—28.1)

This invention relates to means that embodies both a sound record and a transparency which are related as to their subject matter and are adapted to simultaneously produce audio and visual effects when respectively played and projected.

Illustrated lectures, for whatever purpose, ordinarily, are illustrated by motion pictures or successively projected slides and, where recorded sound accompanies the pictures, by a sound track, or by a record that incorporates all of the sound that is related to the plurality of pictures being projected. There is no synchronization of sound and pictures and, frequently, one or the other falls out of synchrony, with results that are confusing to the observer.

An object of the present invention is to provide a sound-reproducing element, a picture-producing element, the two elements relating to the same subject matter, and to so interconnect the elements physically that simultaneous reproduction of sound and picture production is effected, thereby effecting accurate synchrony of sound and picture.

Another object of the invention is to provide means, as contemplated above, that combines a two-sided sound-reproducing element and two independent picture-producing elements respectively related to and in synchrony with the respective sides of the sound-reproducing element.

A further object of the invention is to provide a connected series of such means, thereby, adapting the invention for a serial presentation of the sound and pictures produced by the respective sound and picture components of each means.

A still further object of the invention is to provide means of the character above referred to in which the sound-reproducing component is operatively movable relative to the picture-producing component, particularly adapting the invention to use of a disc record.

This invention also has for its objects to provide such means that are positive in operation, convenient in use, easily installed in a working position and easily disconnected therefrom, economical of manufacture, relatively simple, and of general superiority and serviceability.

This invention also comprises novel details of construction and novel combinations and arrangements of parts, which will more fully appear in the course of the following description, and which is based on the accompanying drawing. However, said drawing merely shows, and the following description merely describes preferred embodiments of the present invention, which are given by way of illustration or example only.

In the drawing, like reference characters designate similar parts in the several views.

FIG. 1 is a front elevational view, partly broken, showing one form of audio-visual device according to the present invention.

FIG. 2 is a front elevational view of another form of the present invention.

FIGS. 3 and 4 are enlarged and broken cross-sectional views on the planes of the respective lines 3—3 and 4—4 of FIG. 1.

FIG. 5 is a front elevational view showing a series of operatively connected devices, as in FIG. 2.

The present audio-visual means 9 comprises, generally, a sound-reproducing element 10, a picture-producing element 11, said elements 10 and 11 relating to the same subject matter, two such elements 11 and 11a in cases where the element 10 is two-sided, the elements 11 and 11a, being related, as regards subject matter, to the respective sides of the two-sided element 10, a transparent member 12 that physically connects the elements 10 and 11 or 11 and 11a, as the case may be, and flexible hinge means 13 to connect a series of such members, each provided with sound-reproducing and picture-producing elements whereby the elements of the invention may be sequentially reproduced and produced as subject-related sounds and pictures.

The sound-reproducing element 10 that is illustrated is shown as a generally conventional disc record 15 having a central aperture 16 and provided with a sound-recorded spiral groove 17 having the characteristics of the sound from which the same is cut in the conventional manner. Such disc is conventionally thin and flexible and highly resistant to destruction or even to marring of the cut groove 17 thereof. With the spindle of a sound reproducer protruding through aperture 16, said element 10 will turn on the axis of said spindle and, in the usual way, an electrical pickup or even a mechanical pickup, operatively engaged with the grooves, will reproduce the sounds that are characteristic of the grooves. In other words, the element 10 is a conventional sound record and may take the various forms of such records, even to change of groove 17 to a magnetic track.

The picture-producing element 11, as well as the element 11a, comprises the usual transparency as used in still and motion picture techniques. The same is, therefore, thin and flexible and bears thereon, in color or black and white, a picture that is capable of being projected onto a screen to a desired size. Instead of a film transparency, the elements 11 and 11a may be made up as glass slides. Regardless how made, the picture of transparency 11 is related, as to subject, to the sound groove 17, and the picture of transparency 11a is related, as to subject, to the sound of the groove on the opposite side of the disc 15. Of course, the transparencies 11 and 11a, in the form of FIG. 2, are relatively reversed so that the same are right-side-up according to whether the groove 17 is being used for sound-reproduction or the groove on the opposite side of the record disc.

It is essential that the member 12 be transparent, at least where the transparencies 11 and 11a are located so that light may pass through the latter for picture projection or production. Also, that the member 12 be so formed that a pickup-head or heads may be operatively associated with the groove or grooves 17 of the element 10.

In this case the member 12 is shown as an envelope of cellophane or other thin transparent plastic material preferably of a flexible nature. Such an envelope may be variously formed to have sides 18 in which openings 19 are formed. After the element 10 has been placed within the envelope, the same may be restrained against displacement by strips 20 that close the ends of the envelope, by staples connecting the sides 18, or by heat-sealing tacks 21 connecting said sides around periphery of element 10. Regardless how the element 10 is kept in position, the same must be left free to be rotated, while in the envelope, by a spindle engaged in aperture 16. Thus, while the disc 15 is being rotated, the envelope may be held non-rotational. The openings 19 are of such size and are so located that at least a portion of the record grooves 17 is exposed and therefore, adapted to be engaged by a pickup head, during record rotation, for reproduction of the sound represented by said grooves. Of course, the size of the openings 19 contemplates the full traverse of the head across the record grooves.

The element 11 or, where two are used, the elements 11 and 11a, are held in place in spaced relation to the element 10, as by transparent strips 22. Said elements are preferably located in the envelope, but it is possible to use an outside position thereof.

Sprocket holes provided in the envelope may be used for feeding the same through a machine in which the sound and picture elements 10 and 11 are simultaneously created, much like a film is fed through a camera. Similar movement or institution of movement may be afforded by a space 23 that is formed between the periphery of the disc 15 and the edge of openings 19. Such space is, therefore, comparable to any movement-effecting means that may be provided.

The envelope or envelopes 9 may be opaque or transparent, and rigid or flexible. Each envelope may have an opening through which the record-centering device can project, if the record is not centered by obstructions in the envelope; it will have an opening through which the record drive will project, if the record is not driven by the record-centering device; it will have an opening through which the reproducer pickup can make physical contact with the record, unless the pickup can function without touching the record, as may be the case with a magnetic pickup; it will have an opening through which the picture can be viewed or projected, if the envelope is not transparent and if the picture is not affixed to the outside of the envelope.

While the means 10 and 11 are shown in spaced relation, one may be placed within an opening in the other. The envelope may be replaced by a stationary hub around which the record rotates; the transparencies may be fixedly carried by the hub.

The foregoing describes a single audio-visual means that may combine the sound and picture of one subject, as in FIG. 1, or the sounds and pictures of two subjects, as in FIG. 2. A series of such means may be provided, as in FIG. 3, to combine a large number of subjects, related or not, and to present them in serial fashion, one after the other. The flexible hinges 13 permit of the means 9 being folded one on the other, in accordion arrangement, to form a stack from which the means are successively fed.

The term "transparency" as used in this application means any thing or picture capable of being projected.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. An audio-visual device for loosely holding a plurality of audio discs, each having a sound track, a central spindle-engageable hole, and a peripheral drive rim, and for fixedly retaining in offset relation to the disc thereof at least one photographic transparency related in subject matter to the sound of the track on the respective disc, said device comprising:

(a) a plurality of flexible holders, each having openings and restrictions arranged to loosely confine, in one portion thereof, one of said audio discs with the hole and parts of the sound track and drive rim thereof exposed through the mentioned openings in the holder to give access of a mounting and locating spindle for the disc to the hole therein, engagement of drive means with said drive rim, and engagement of a reproducing head with the entire sound track of the disc during rotation thereof under drive of the drive means, and (b) means to connect said plurality of holders in a row in edge-to-edge relationship, said means comprising flexible hinge means on which the holders are adapted to be folded in accordion fashion, each holder of the row pulling the next holder, by means of the hinge means connecting them, into position in which the disc thereof is individually engaged by the reproducing head above mentioned.

2. An audio-visual device which comprises:

(a) a plurality of transparent envelopes each of which includes a front side and a rear side joined by folded portions along the edges of said sides to define a narrow pocket between said sides, coinciding openings extending through said sides;

(b) each of said envelopes further including an audio disc having a sound track disposed in one end of said pocket between said sides with means for co-operation with disc driving means and the width of a section of said track exposed to the outside of said envelope by said openings, means loosely confining said disc for rotation within said envelope whereby rotation of said disc will successively expose all sections of said track through said openings;

(c) each of said envelopes including at least one photographic transparency related in subject matter to the sound on said track disposed in another section of said envelope adjacent to said disc but remote from said disc and said openings; and (d) said plurality of envelopes being disposed in a row in edge-to-edge relationship and with the adjacent edges being joined by flexible hinge means whereby said plurality of envelopes may be folded in accordion arrangement.

References Cited in the file of this patent

UNITED STATES PATENTS

| | | |
|---|---|---|
| 1,295,763 | Kohn | Feb. 25, 1919 |
| 1,502,312 | Mayhew | July 22, 1924 |
| 1,541,002 | Shramek | June 9, 1925 |
| 2,202,925 | Schoch | June 4, 1940 |
| 2,306,726 | Hasin | Dec. 29, 1942 |
| 2,555,594 | Markovitz | June 5, 1951 |
| 2,776,085 | Furey | Jan. 1, 1957 |
| 2,824,686 | Hamilton | Feb. 25, 1958 |
| 2,961,922 | Schwartz | Nov. 29, 1960 |

FOREIGN PATENTS

| | | |
|---|---|---|
| 337,554 | Great Britain | Nov. 6, 1930 |
| 771,981 | Great Britain | Apr. 10, 1957 |